(12) United States Patent
Ferrari

(10) Patent No.: US 9,052,050 B2
(45) Date of Patent: Jun. 9, 2015

(54) VALVE DEVICE FOR THE ASSEMBLY IN IN-SERVICE PIPELINES AND THE ASSEMBLY PROCEDURE OF SAID DEVICE

(76) Inventor: Santiago Alberto Ferrari, Buenos Aires (AR)

( * ) Notice: Subject to any disclaimer, the term of this patent is extended or adjusted under 35 U.S.C. 154(b) by 214 days.

(21) Appl. No.: 13/611,980

(22) Filed: Sep. 12, 2012

(65) Prior Publication Data
US 2013/0061943 A1 Mar. 14, 2013

(30) Foreign Application Priority Data
Sep. 12, 2011 (AR) .............................. P20110103305

(51) Int. Cl.
| F16L 41/06 | (2006.01) |
| F16L 55/10 | (2006.01) |
| F16L 47/34 | (2006.01) |

(52) U.S. Cl.
CPC ............ *F16L 55/1018* (2013.01); *F16L 47/345* (2013.01); *F16L 41/06* (2013.01)

(58) Field of Classification Search
CPC ....... F16L 41/06; F16L 47/345; F16L 55/105; F16L 55/1018
USPC ............... 137/318, 317, 15.13, 15.14, 15.18, 137/315.01; 408/67, 87, 112
See application file for complete search history.

(56) References Cited

U.S. PATENT DOCUMENTS

| 587,108 | A | | 7/1897 | Sherrerd |
| 2,396,964 | A | | 3/1946 | O'Brien |
| 3,650,547 | A | * | 3/1972 | Tickett .......................... 137/318 |
| 3,665,953 | A | | 5/1972 | Chronister |
| 4,527,586 | A | | 7/1985 | Yano et al. |
| 5,063,957 | A | | 11/1991 | Yano et al. |
| 5,483,990 | A | * | 1/1996 | Martin .......................... 137/318 |
| 5,620,020 | A | | 4/1997 | Collins |
| 6,041,806 | A | | 3/2000 | Maichel |
| 8,613,291 | B2 | * | 12/2013 | Heffernan ..................... 137/317 |

* cited by examiner

*Primary Examiner* — Kevin Lee
(74) *Attorney, Agent, or Firm* — Noli IP Solutions PC; Karim Lagobi

(57) ABSTRACT

A valve device and assembly procedure thereof on a in-service pipeline by mounting an assembly that includes an operative subset, a deposit subset, and lateral sets which are assembled on a pipeline so that, without shutting down the pipeline service, the pipeline is perforated, and valve seats, included with the valve device, are displaced until the device is in-service, thus arranging the valve device to enable the control of the fluid circulation through the pipeline.

17 Claims, 7 Drawing Sheets

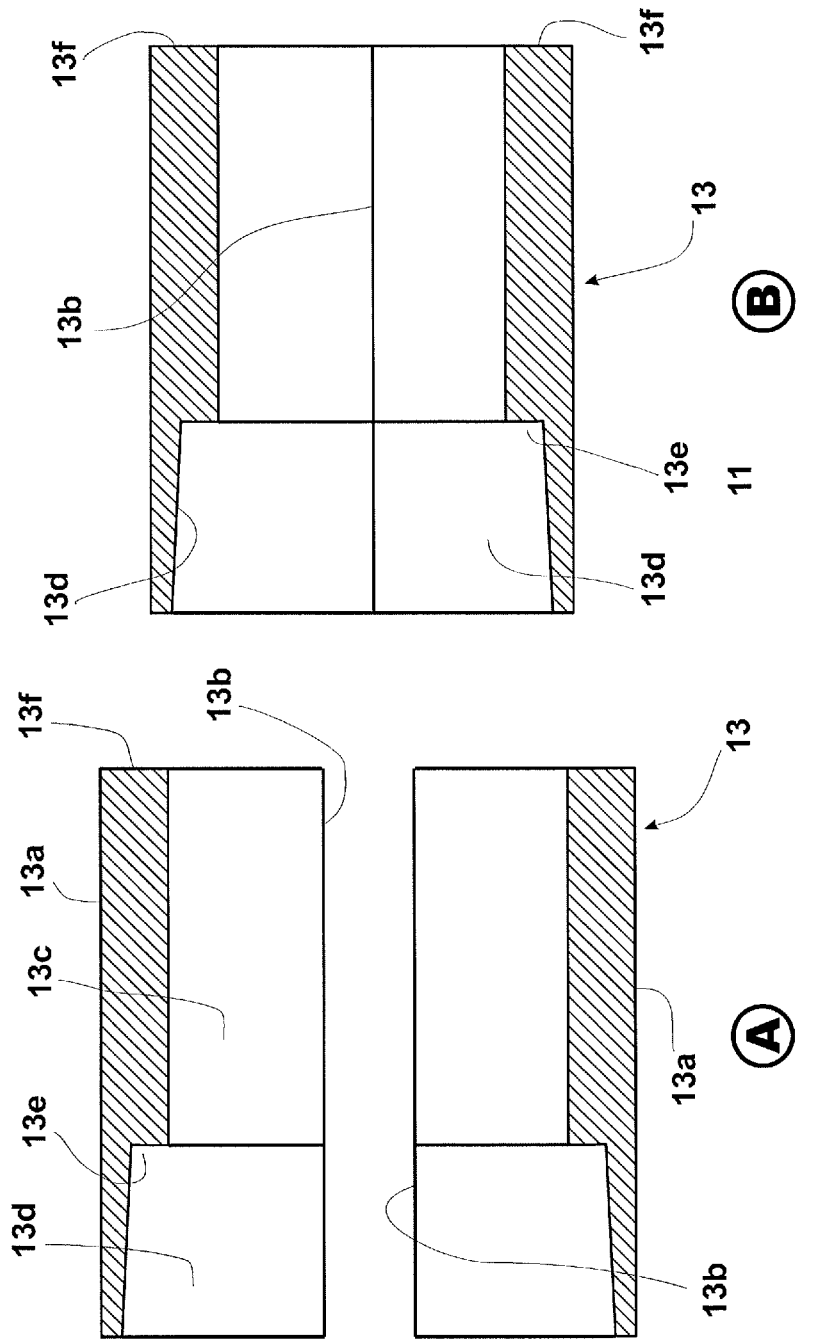

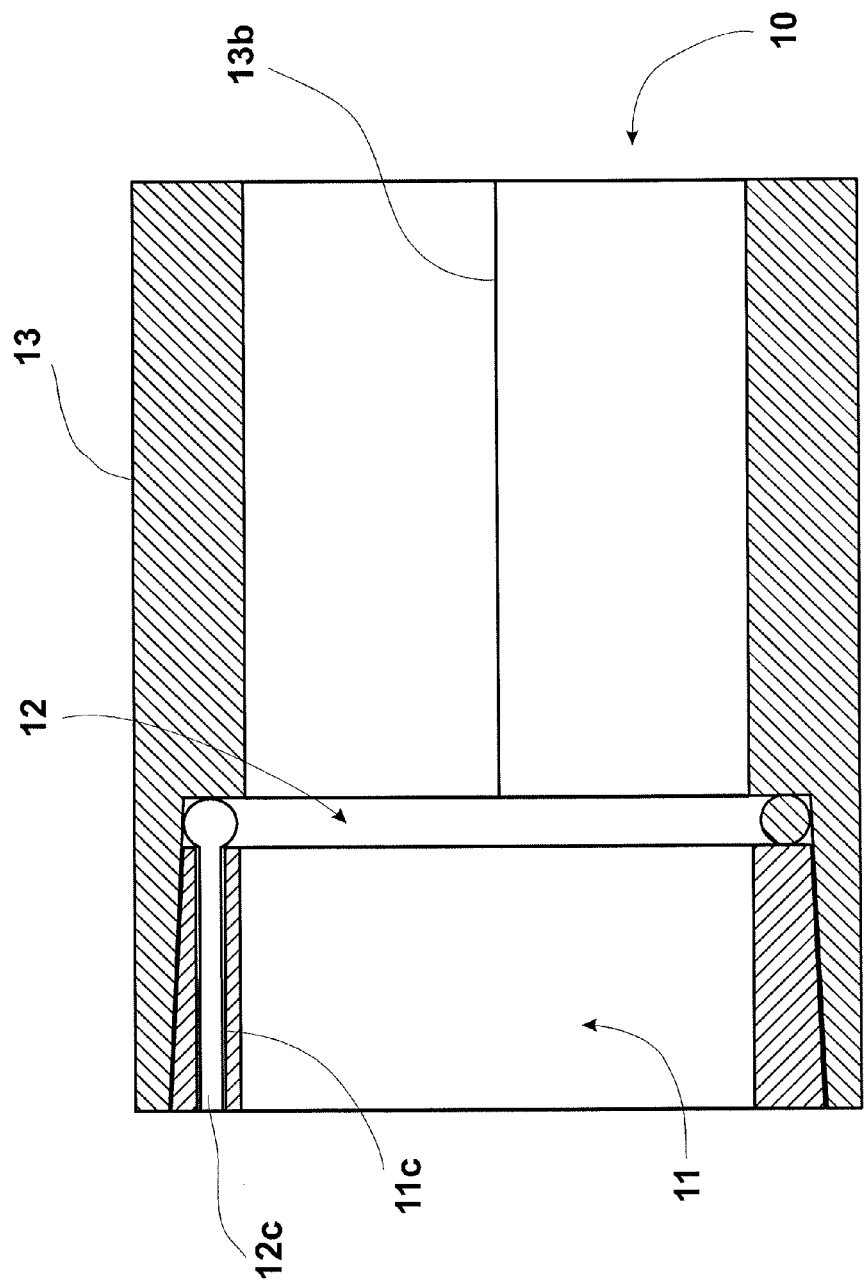

VALVE DEVICE FOR THE ASSEMBLY IN IN-SERVICE PIPELINES AND THE ASSEMBLY PROCEDURE OF SAID DEVICE

TECHNICAL FIELD

The present invention relates to a valve device for assembly in in-service pipelines and the assembly procedure thereof.

More particularly, it can include a valve device for assembly in in-service pipelines, with an operative subset, in which a cutting means and a valve means are aligned, and with a very efficient subset of the valve seat such that everything can be easily installed and operated.

BACKGROUND

Different valve types are known for assembly in pipelines. In general, the existing systems and devices are usually applications with little involvement as regard to pressures, temperatures, and fluids. Besides, the complexity of their operation requires specialized staff, not only for their installation, but for their operation as well.

It is known the system disclosed by the patent document U.S. Pat. No. 6,041,806 can only be applied to soft pipelines made of materials such as plastic, PVC, lead, polyethylene, etc., due to that fact that conceptually, the ball cuts the pipe with one of its edges, upon rotating the valve stem, and this is only possible in pipes made of soft materials.

In addition, this system is limited to low pressures, of about 2 to 5 bars and, to pipelines that, in some way, are underground or in walls. This is due to the fact that the axial force caused by the pressure, cannot be sustained safely by the adjustment of the split body with rubber seals. Thus, and even though this is acceptable in water, it is not recommended in gas or other applications, and even less in refineries and the chemical or petrochemical industry in general.

Besides, the seal of the ball with o-rings within the body of the valve is not effective as the cutting edge of the ball (which is used to cut the pipe) tends to engage the o-ring, generating its later breaking.

It can also be observed that due to the design of the stem that moves the ball, the stem can be expelled by the pressure.

The patent document U.S. Pat. No. 5,620,020 discloses a device designed to work in plumbing tasks, as its sealing system is very precarious. This is due to the fact that there is not a good adjustment of the seal to the body that is inserted upwards. In addition, the shears type cutting is not very good, so imperfections may affect the seal.

In this manner, the above mentioned device is exclusively limited to plumbing tasks which utilize soft pipes, like those made of plastic, lead and eventually, in some cases, a material of the type called hydrobronz. Axial forces, due to the pressures on the pipelines, may be high, and this system does not have a solution for this because the adjustment of the split body with rubber seals on the pipe is not safe.

As it may be observed in FIGS. 1, 2, 3, 4 and 5, its inefficiency if applied to medium and high pressures is clearly evident, particularly with fluids having certain risk, such as fuel or toxic gases, and in cases of pipelines made of steel, cast, stainless, etc. Besides, seats of o-ring type are not displaceable or suitable because they are elastic and there are chances of breaking upon turning the ball.

Even though displaceable seats are disclosed in other patent documents, such as U.S. Pat. Nos. 0,587,108, 2,396,964, 3,665,953, 4,527,586, and U.S. Pat. No. 5,063,957, none of them utilizes split tightness joints with extensions for transverse sealing.

In addition, the above mentioned documents show devices that are only useful for underground pipelines, where axial forces, once the pipe is cut, are supported by the same soil covering the pipe.

BRIEF SUMMARY

An advantage of the present system is that the valve means may be a rotating element, for instance, of a totally or partially spherical type, cylindrical, conical, truncated cone, etc., which, as the conventional spherical valve, has the same function and its use is widespread in the industry.

A further advantage is that the split seats may be made of materials such as Teflon, with tightness joints and which move to perform the sealing, by means of sealed screws. It utilizes a cutting means of the tapping saw type, that may be standard, or with openings for the passage of the fluid, while the cutting is performed.

Yet another further advantage is that the simplicity of the different components, the precision of the finishes to obtain seals to be used in high pressures and temperatures, and the simple valve element, simplify the design of the seats, minimize mobile pieces and ensure the sealing.

A further advantage lies in the fact that, under the operative point of view, the present device does not offer further difficulties than conventional valves. Therefore, the average operator may handle it without much trouble, without the need of prior training and without being a specialized technician.

Another advantage is that, due to its features, the present device may be manufactured in compliance with the international norms and standards: API, ASME, DIN, etc.

Statistical studies that have been carried out in the oil industry, and for new facilities, indicate the following:

20% of valve devices are not driven until after 10 years of being installed,

60% of said devices are driven within the range of 1 to 10 years of installation; and 20% of said devices are driven within 1 year of their installation.

Consequently, if production costs are taken into account, the present device has the advantage that there is no need to assemble it during the construction of a facility, with its consequent cost increase. Its simplicity in installation and operation enables to leave its installation for the time when it becomes really necessary.

Another advantage derived from the one above, is that, as the new device is installed when needed, it is ensured that it will work properly, and with a longer life span, because it will be new.

A further advantage is that the welded body of the entire device makes its structure be able to bear the different efforts, and therefore, it can be installed in aerial as well as underground applications.

Another advantage is that the fluid needs not to be stopped for installation.

A further advantage is that it is applicable to practically all the fluids which are currently handled by the conventional ball valves.

Another further advantage is that it is applicable in the entire range of pressures: low, medium and high pressure.

Yet another advantage is that it is applicable in the entire range of temperatures, depending only on the material of the seats, as, functionally and constitutively, it is in condition to work in any situation.

Given the above mentioned advantages, the present device results to be completely apt for the so called risk industries:

chemical, petrochemical, oil, gas, etc. In these kinds of industries, this device enables stops to be made for maintenance, to act in situations of damage or danger, avoid plant stops, stops of critical systems, and avoid emissions to the atmosphere, and incidents in general.

Since it consists of a device which is assembled welded, it resists axial forces.

It also has the advantage that it may be applied to plastic weldable pipes, such as polyethylene, polypropylene, etc.

BRIEF DESCRIPTION OF THE DRAWINGS

To clarify and understand better the aim of the invention, it is illustrated with several figures in which it was represented in an embodiment, as an illustrative, not limitative example:

FIG. 6A is a longitudinal section of the containment cuff showing its two split half-bodies to enable assembly on the valve seat and the tightness joint.

FIG. 6B is another longitudinal section of the containment cuff with its two half-bodies already joined.

FIG. 7 is a longitudinal section of the subset of the valve seat, which shows the assembly and linking between the containment cuff, the displaceable valve seat, and the tightness joint.

Among the figures, the same reference numbers and/or letters indicate the same or corresponding parts.

DETAILED DESCRIPTION

Figure 1:
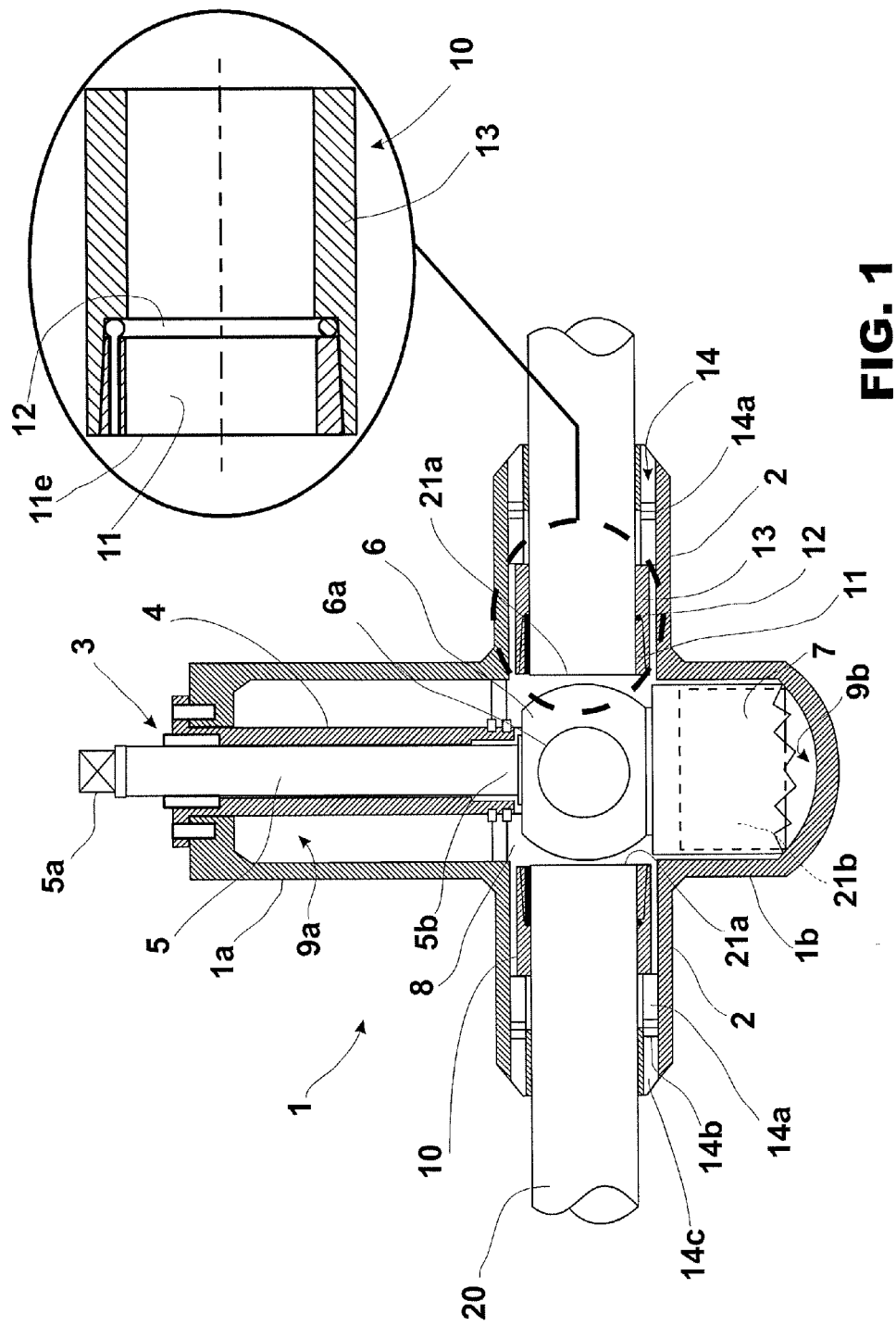
FIG. 1 is a longitudinal section of the present valve device, wherein it is shown how the cutting means has cut a portion or bite of the application pipeline. The positioning of the valve means is also shown. The section also includes a detail of the subset of the valve seat with its components.
Figure 2:
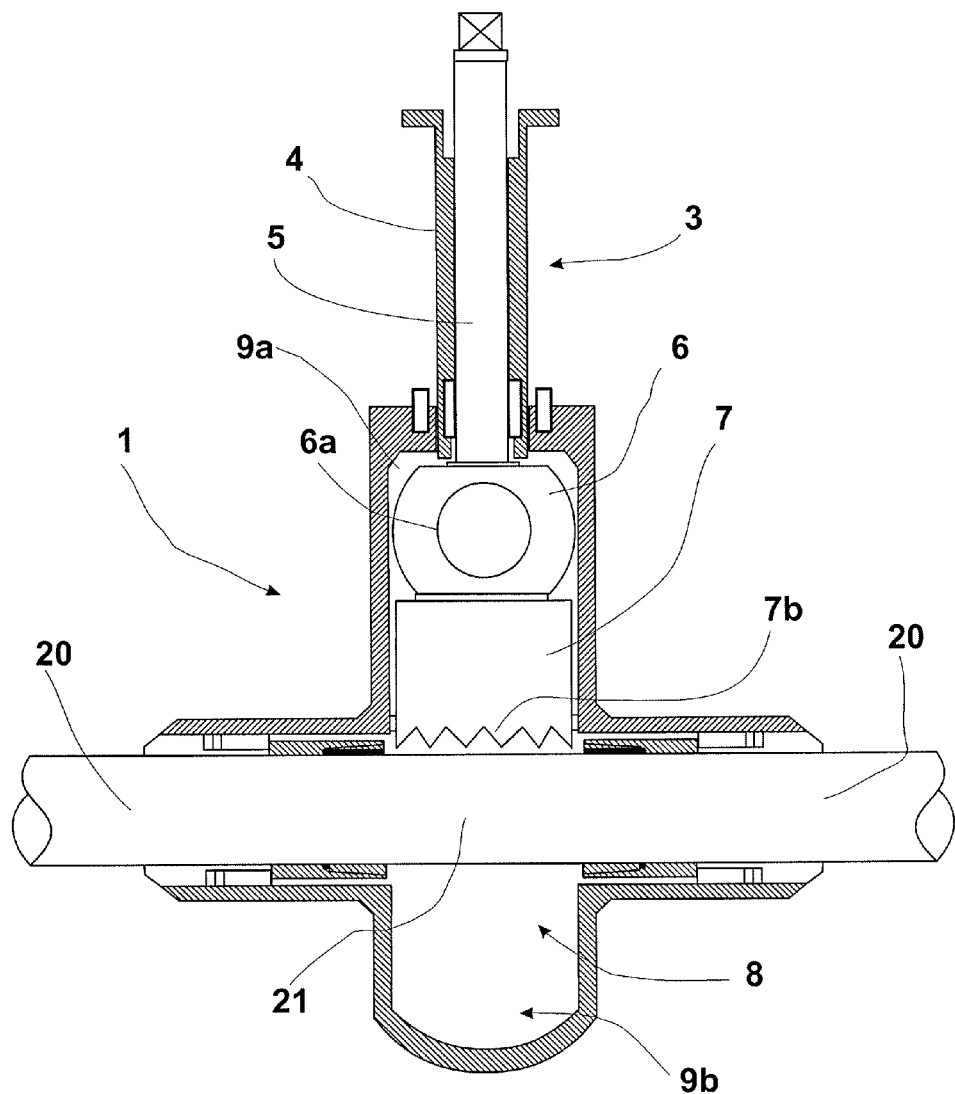
FIG. 2 is another longitudinal section of the present device showing the position of the cutting and valve means prior to cutting the application pipeline.
Figure 3:
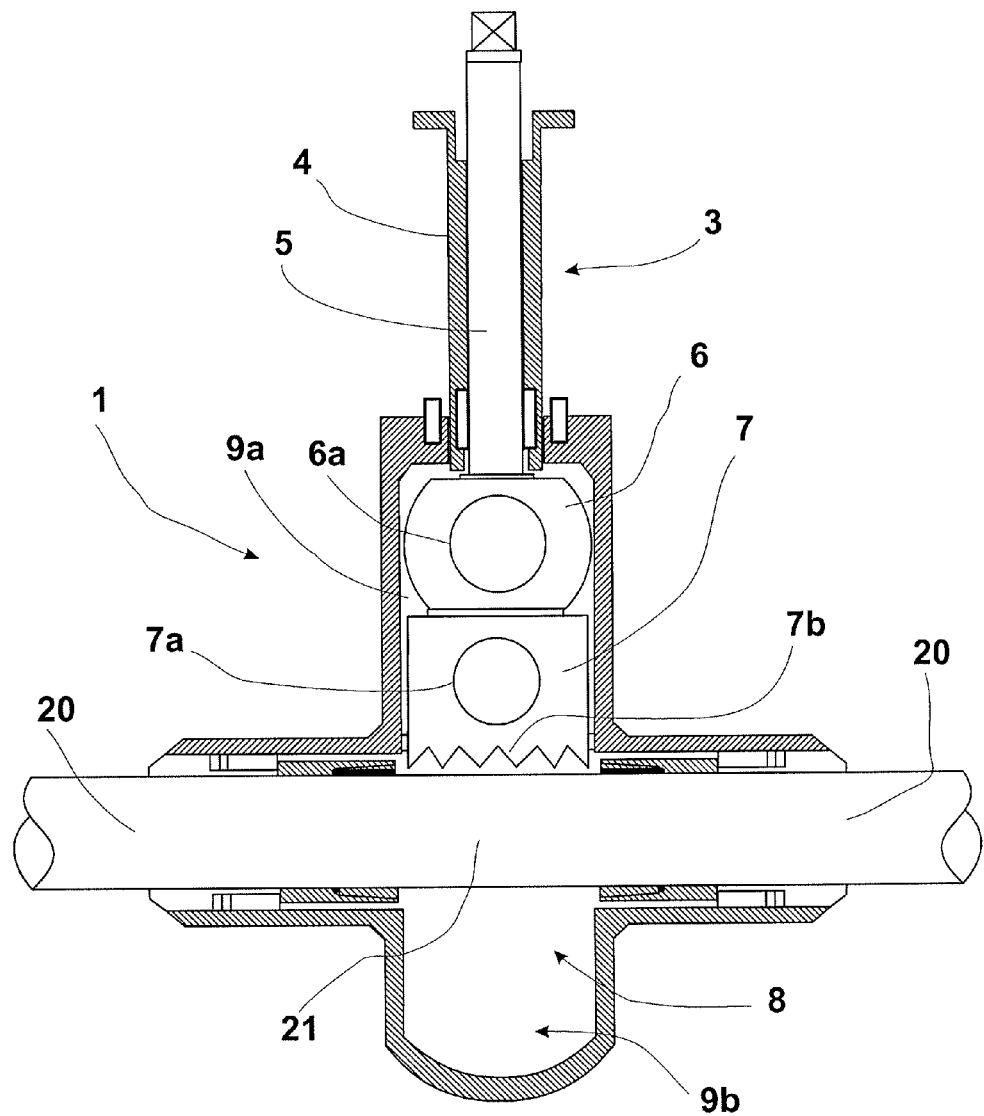
FIG. 3 is another longitudinal section similar to FIG. 2 wherein a cutting means provided with passages is shown.
Figure 4:
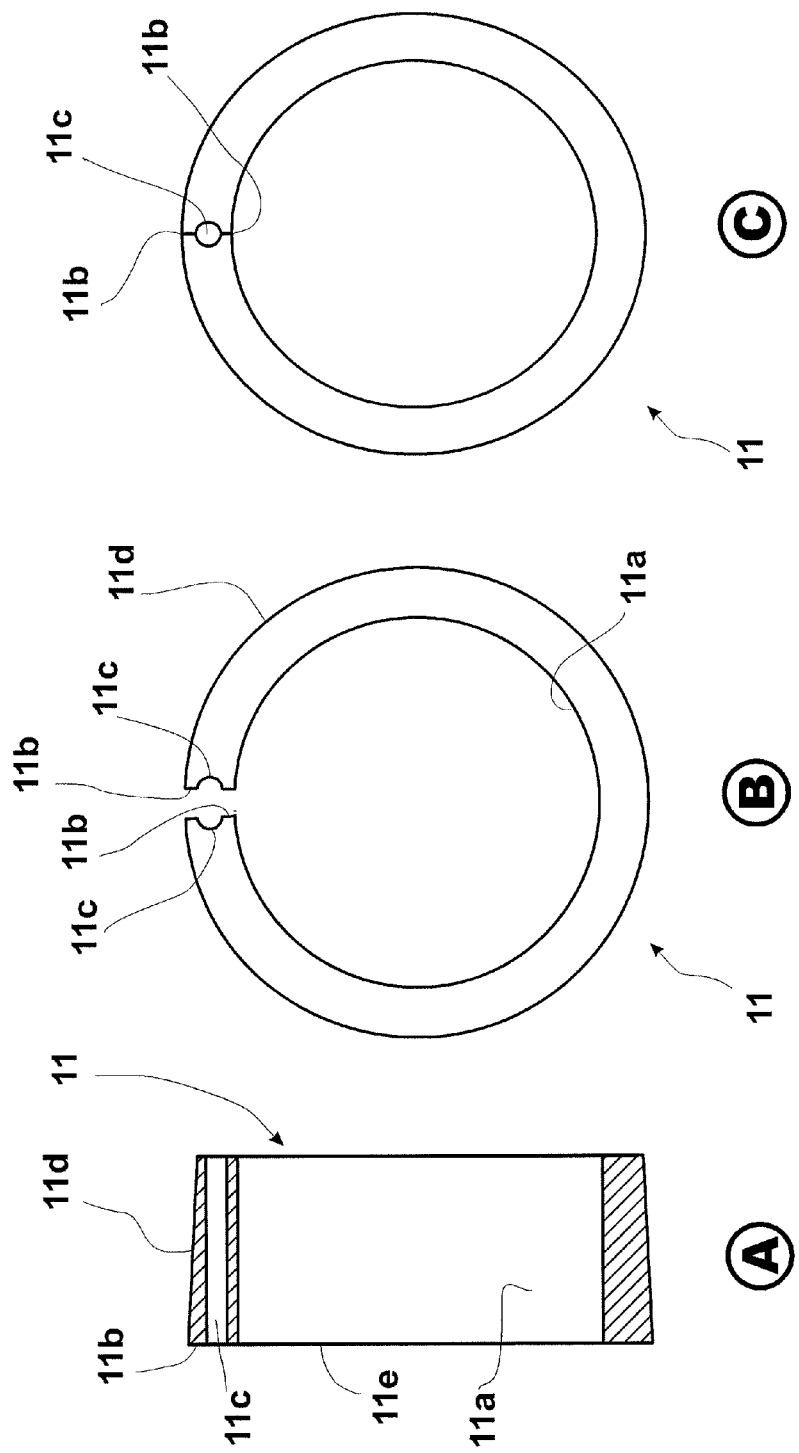
FIG. 4A is a longitudinal section of the displaceable valve seat.
FIG. 4B is a front elevational view of the valve seat with its split joint parts to enable its assembly in the pipeline.
FIG. 4C, is another front elevational view of the valve seat with its joint parts already adhered.
Figure 5:
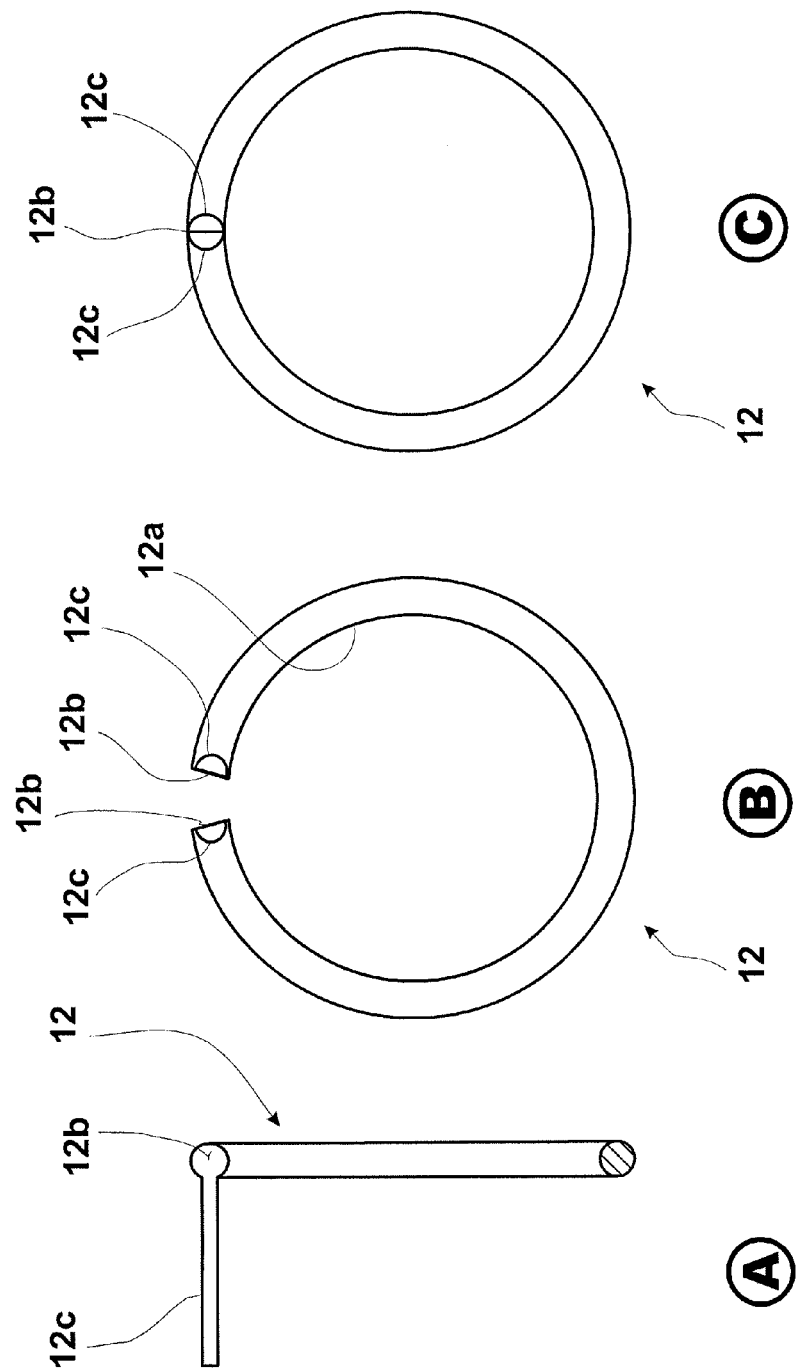
FIG. 5A is a longitudinal section of the tightness joint showing the projection of the linking member.
FIG. 5B is a front elevational view of the tightness joint with its split joint parts to enable its assembly in the pipeline.
FIG. 5C, another front elevational view of the tightness joint with its joint parts already adhered.

In general, the present invention refers to a valve device for assembly in in-service pipelines which comprises a set of mounting and assembly (1) integrated by an operative subset (1a), a deposit subset (1b), and lateral sets (2) which are mounted on an application pipeline (20) in order to, without shutting down the service of the pipeline (20), perforate it with cutting means (7), and arrange valve means (6) which enables the control of the fluid circulation through the above mentioned pipeline (20). The invention also refers to an assembly procedure, which, through its stages, enables the assembly of the sets (1) (2) and subsets (1a) (1b) (10) on the pipeline (20), the perforation of the pipeline (20), the positioning of the valve means (6) and the displacement of the valve seats (11) until the device is in-service.

More particularly, the present invention refers to a valve device for assembly in in-service pipelines, which is prepared to be mounted on a tubing line or pipeline (20) where a fluid circulates continuously, with the purpose of perforating it without shutting down the service and introducing valve means (6), which allow to control the circulation of the fluid between the extreme positions of maximum circulation and shutting-off The present device comprises a mounting and assembly set (1) which, once arranged and assembled, enables the shaping of an operative (9a) (9b) air-tight housing (8) around the selected section (21) of the application pipeline (20). This set of mounting and assembly (1) comprises an operative subset (1a) and a deposit subset (1b).

The operative subset (1a) forms an elongated body which delimitates an operative cavity (9a). Said operative cavity (9a) is crossed by drive means (3) which comprise an outer drive (4) and an inner drive (5). The above mentioned outer drive (4) enables their axial displacement (3), while the inner drive (5) enables a turning or rotary movement.

The inner drive (5), on the one hand, ends in a command end (5a) which projects out of the operative subset (1a), whereas, on the opposite part, it ends in an inner end (5b) where a valve means (6) and a cutting means (7) are subsequently aligned. The valve means (6) may be formed by a rotary body which, outside, may be partially or totally spherical, cylindrical, conical, truncated-conical or any other shape enabling the valve passage (6a) which crosses its body, to be rotationally aligned or misaligned with relation to the fluid circulation duct of the application pipeline (20).

In front of the valve means (6), comprising the most extreme part of the drive means (3), there is a cutting means (7) that may be formed, for instance, by a tapping saw. This tapping saw may be provided with a cutting passage (7a), which crosses its opposite walls, and its body ends into a cutting tooth (7b).

In addition, the set of mounting and assembly (1) comprises a deposit subset (1b) whose body forms a deposit cavity (9b) that provides the necessary room for the course that the cutting means (7) and the valve means (6) need to perforate the pipeline (20) and to position themselves.

The set of mounting and assembly (1) also projects laterally, comprising two lateral sets (2). Into these lateral sets (2) mounted on the application pipeline (20), on both sides of the course to be cut (21), both subsets of valve seat (10) and their respective displacement means (14) are arranged.

Each subset of valve seat (10) comprises a displaceable valve seat (11), a tightness joint (12) and a containment cuff (13).

The displaceable valve seat (11) is a piece whose body is split in order to enable its assembly. It has a sliding partition (11a) which enables its displacement on the body of the pipeline (20), and is provided with some joint partitions (11b) that may be joined or adhered for the assembly of the seat (11). Said assembly defines a linking opening (11c) able to be coupled to the linking member (12c) of the tightness joint (12).

Externally, it forms a crowned partition (11d) which enables its proper positioning when its edge of valve seat (11e) contacts the valve means (6).

The tightness joint (12) is a split piece to enable its assembly on the application pipeline (20). Its annular body (12a) ends in two joint edges (12b) that may be joined by means of glue. In the present embodiment, said joint edges (12b) extend transversely, forming the two parts or half-bodies of a linking member (12c), which is defined when said joint edges (12b) are joined. This linking member (12c) is inserted in the linking opening (11c) of the displaceable valve seat (11).

The displaceable valve seat (11) and the tightness joint (12), assembled and joined in this manner, are arranged into the containment cuff (13). The latter (13), usually metallic, comprises two half-bodies (13a) which are assembled by joining their joint edges (13b). Thus, its tubular cavity (13c) is assembled on the application pipeline (20), while in the truncated-conical cavity (13d) the displaceable valve seat (11) is placed and joined to the tightness joint (12) which fits in the corresponding tightness bottom (13e).

The displacement means (14) act on the displacement cylinder head (13f) of the containment cuff (13). These displacement means (14) comprise a displacement stem (14a) with its corresponding head (14b), which can be accessed through a command opening (14c). In an embodiment, these displacement means (14) may have a threaded stem (14a), so that, by having access with a proper tool through the command opening (14c), the stem (14a) displaces by pushing the cylinder head (13f) of the containment cuff (13). This displacement continues until the displaceable valve seat (11) contacts the valve means (6).

Once the device is assembled on the application pipeline (20), the drive of the command end (5a) enables the rotary displacement of the cutting means (7), which tooth (7b) cuts a course or bite (21b) in said pipeline (21). This bite (21b) falls into the deposit cavity (9b).

Once the cutting of the pipeline is completed (21), the fluid will be contained by the air-tight housing (8), preventing any leakage outwards. In addition, the valve means (6) is inserted in the pipeline (21).

In these conditions, the displacement means (14) are used until the edges (11e) of the displaceable valve seats (11) contact the above mentioned valve means (6).

In this manner, the device is installed and in an operative condition.

The present assembly procedure may comprise a first step of cleaning and preparation for the welding of the tubular course (21b) on which the present valve device will be assembled.

With the application pipeline (20) in proper condition, the subsets of valve seat (10) are assembled on both sides of the course (21b) of the pipeline (20) to be perforated. For that purpose, the tightness joints (12) are arranged on both sides of said course (21b) and are joined to the joint edges (12b). Then, the displaceable valve seats (11) are placed and also, their joint partitions (11b) are joined. The member (12c) is inserted in the linking opening (11c) and over both pieces (11) (12), the containment cuff (13) is assembled, and its joint edges (13b) are joined by welding.

Later, a deposit subset (1b) is assembled and is partially fixed to the pipeline (20), for example, by means of some welding spots.

Then, the operative subset (1a) is assembled and also the pipeline (20) is partially fixed with the deposit subset (1b). With both subsets positioned (1a)(1b), they (1a)(1b) are joined to one another and with the pipeline (20), by means of welding, until the set of mounting and assembly (1) are shaped with an air-tight housing (8) inside it.

Afterwards, the drive means (3) are used, so that the inner drive (5) turns round and the cutting means (7) perforate in the treated tubular course (21). Once perforation is completed, the inner drive (5) advances until the cutting means (7) and the cut course (21b) move towards the deposit cavity (9b).

The movement of the inner drive (5) is performed until the valve means (6) is left at the level of the cut edges (21a) of the application (20).

Then the displacement means (14) are used to move the displaceable valve seats (11), until they (11) get in contact with the rotary valve means (6).

In these conditions, the tightness of the set of mounting and assembly (1) enables the cutting of the pipeline (20) and the enabling of the valve means (6) without causing the shutting down of the service.

Undoubtedly, upon putting the present invention into practice, modifications may be introduced as far as certain details of construction and form are concerned, without this implying to set apart from the fundamental principles which are clearly explained in the following claims:

LIST OF MAIN REFERENCES (1) Set of mounting and assembly.
(1a) Operative subset.
(1b) Deposit subset.
(2) Lateral sets
(3) Drive means.
(4) Outer drive.
(5) Inner drive.
(5a) Command end.
(5b) Inner end.
(6) Valve means.
(6a) Valve passage.
(7) Cutting means.
(7a) Cutting passage.
(7b) Cutting tooth.
(9a) Air-tight housing (8)
(9a) Operative cavity [it forms the upper part of an air-tight housing (8)].
(9b) Deposit cavity [it forms the lower part of an air-tight housing (8)].
(10) Subset of the valve seat.
(11) Displaceable valve seat.
(11a) Sliding partition.
(11b) Joint partitions.
(11c) Linking opening.
(11d) Crowned partition.
(11e) Edge of valve seat.
(12) Tightness joint.
(12a) Annular body.
(12b) Joint edge.
(12c) Linking member.
(13) Containment cuff.
(13a) Half-bodies integrating the cuff (13).
(13b) Joint edge of the half-bodies (13a).
(13c) Tubular cavity.
(13d) Truncated-conical cavity.
(13e) Tightness bottom.
(13f) Displacement cylinder head.
(14) Displacement means.
(14a) Displacement stem.
(14b) Stem head (14a).
(14c) Threaded command opening.
(20) Application pipeline.
(21) Tubular section submitted to cutting.
(21a) Cut edges of the pipeline (20).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims)

are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve device for assembly in in-service pipelines, said valve device is prepared to be assembled on a pipeline, while continuous fluid circulation is maintained through the pipeline, in order to perforate said pipeline and assemble said valve device to act as a flow control of said fluid circulation between a position of maximum circulation and a shut-off position, said valve device comprises:
    a mounting assembly able to form an operative air-tight housing on a portion of a pipeline prepared to be cut by perforation,
    said mounting assembly including an operative subset and a deposit subset,
    said operative subset including a cutting means and a valve means, wherein said cutting means and said valve means are aligned on a drive means positioned transversely to said portion of said pipeline,
    said deposit subset including a passage for said cutting means, the deposit subset being adapted to lodge a cut pipeline bite,
    a plurality of lateral sets which, when assembled on said portion of said pipeline, comprise subsets of a valve seat on both sides of the location where said pipeline is to be cut; and
    each subset of the valve seat includes a valve seat displaceable in order to bring said valve seat into in contact with said valve means, a tightness joint (12) having a linking means (12c) for connecting said tightness joint with said valve seat, and a containment cuff of said seat and joint.

2. The valve device according to claim 1, wherein the valve means forms a rotary body.

3. The valve device according to claim 1, wherein the cutting means comprises a rotary tapping saw.

4. The valve device according to claim 3, wherein the rotary tapping saw comprises a passage able to align with the duct of the pipeline so that the passage enables the circulation of the fluid therethrough.

5. The valve device according to claim 1, wherein the drive means comprises a drive axis which ends in a command end common to the cutting means and the valve means, and arranged so that said cutting means are in front of said valve means.

6. The valve device according to claim 1, wherein the deposit subset forms a cavity able to provide room for the cutting means and room for deposit of the bite of the treated pipeline portion.

7. The valve device according to claim 1, wherein each lateral set comprises a corresponding subset of the valve seat, which comprises:
    a valve seat, which is split for its assembly on the pipeline, and which is capable of displacement until a contact limit with the valve means,
    a tightness joint, which is split for its assembly on the pipeline, and
    a containment cuff, which is split for its assembly, containing said seat and joint.

8. The valve device according to claim 7, wherein the tightness joint comprises a split member adapted to be inserted in an opening cooperatively provided by the valve seat, which is also split and adapted to be joined around the pipeline.

9. The valve device according to claim 7, wherein the containment cuff provides a tapered cavity which lodges the valve seat and the tightness joint.

10. The valve device according to claim 1, wherein the valve seat subset is provided with displacement means, which comprise a set of stems ending in drive ends, and wherein the drive ends are able to displace the valve seat until said valve seat contacts the valve means.

11. An assembling procedure for the valve device of the claim 1, comprising:
    assembling the subsets of the valve seat to both sides of a portion of a pipeline to be cut using perforation, starting with the valve seats and the tightness joints, and continuing with the containment cuffs,
    assembling and fixing, at least partially, the deposit and operative subsets,
    joining, at least partially, said deposit and operative subsets, to the pipeline and to one another,
    driving the drive means until the cutting means perforates the portion of the pipeline,
    continuing to drive the drive means until the valve means are positioned in the perforation of the pipeline, and
    using a displacement means to displace the valve seats until the contact limit with said valve means.

12. An assembly procedure according to claim 11, wherein the step of assembling a set of valve seats comprises the following steps:
    arranging tightness joints, having split parts, to both sides of said portion of the pipeline and joining said split parts,
    placing the valve seats and joining their split parts,
    linking said valve seats to said tightness joints, assembling containment cuffs, having split parts, above said seats and said joints, and joining said split parts of said containment cuffs.

13. An assembly procedure according to claim 12, comprising the step of assembling the Valve seat by joining corresponding parts of the Valve seat and the tightness joint.

14. An assembly procedure according to claim 11, wherein, after assembling the mounting assembly on the pipeline, the deposit and operative subsets are joined to each other and to the pipeline by welding.

15. An assembly procedure according to claim 14, wherein the step of assembling and fixing the deposit and operative subsets, comprises, first, partially fixing said deposit and operative subsets to the pipeline and partially fixing said deposit subset and operative subset to one another, and then, fixing said deposit subset and operative subset to one another.

16. An assembly procedure according to claim 11 further comprises preparing the pipeline for welding prior to assembly of said valve device.

17. An assembly procedure according to claim 11, wherein, after fully assembling said valve device a tightness test of said assembly is carried out.

* * * * *